United States Patent [19]

Loewenstern et al.

[11] Patent Number: 4,531,416

[45] Date of Patent: Jul. 30, 1985

[54] PRESSURE TRANSDUCER

[75] Inventors: Kenneth Loewenstern, Langhorne; Daniel M. Clementi, Perkasie; Glenn Kipp, Quakertown, all of Pa.

[73] Assignee: Ametek, Inc., New York, N.Y.

[21] Appl. No.: 541,139

[22] Filed: Oct. 12, 1983

[51] Int. Cl.³ .......................... G01L 7/04; G01L 9/10
[52] U.S. Cl. ........................................ 73/735; 73/739
[58] Field of Search ................... 73/735, 739, 432 A, 73/756, 714, 722, 728; 336/30

[56] References Cited

U.S. PATENT DOCUMENTS

| | | | |
|---|---|---|---|
| 1,565,447 | 12/1925 | Heise | 73/739 |
| 2,050,629 | 8/1936 | Quereau et al. | 73/735 |
| 2,640,971 | 6/1953 | MacGeorge | 340/196 |
| 2,796,765 | 6/1957 | Huston | 73/414 |
| 3,048,040 | 8/1962 | Pegram | 73/412 |
| 3,412,387 | 11/1968 | Millar | 73/735 |
| 3,605,500 | 10/1969 | Trekell | 73/739 |
| 3,915,008 | 10/1975 | Silverman et al. | 73/392 |

OTHER PUBLICATIONS

Herceg, Handbook of Measurement and Control, 1976, Chapter 11.

Primary Examiner—Donald O. Woodiel

[57] ABSTRACT

A linear variable differential transformer pressure transducer includes a pressure sensing element which is deformed in response to changes in the pressure of a fluid. The pressure sensing element is connected to the core of a differential transformer, the coils of which are mounted on a dashpot within which the core is disposed. The dashpot is filled with a damping fluid which surrounds the core. The core enters the dashpot through an opening in a flexible boot which covers the open end of the dashpot to prevent leakage of the damping fluid. The pressure transducer serves to suppress destructive harmonic resonances of the Bourdon tube by imparting a variable restraining force on the linear movement of the core. The pressure transducer exerts a minimal restraining force to the low frequency movements of the core caused by normal fluctuations in the fluid pressure, but exerts a high restraining force against sudden pressure transients or vibration near the pressure sensing element's resonant frequency.

8 Claims, 3 Drawing Figures

U.S. Patent    Jul. 30, 1985    4,531,416
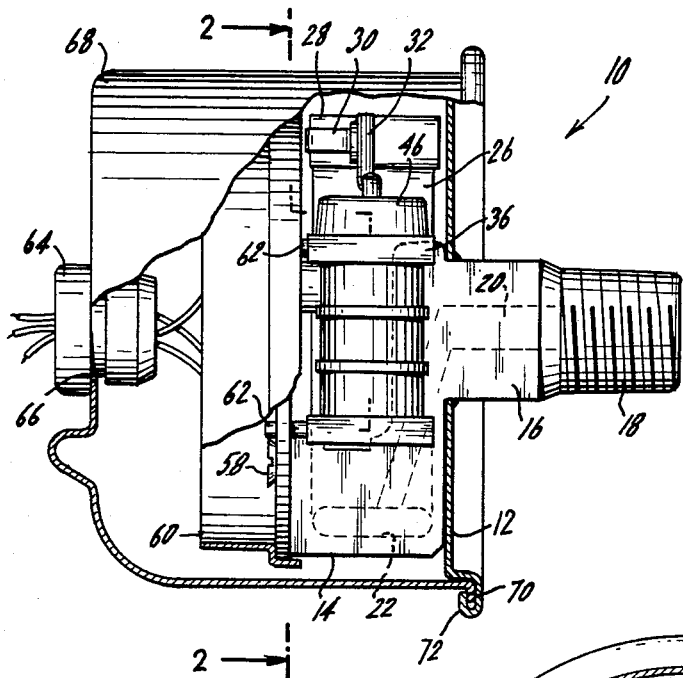
FIG. 1.
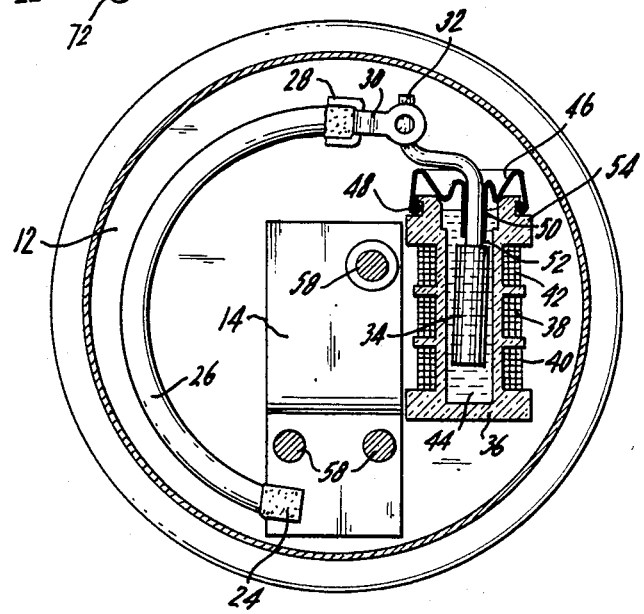
FIG. 2.
FIG. 3.
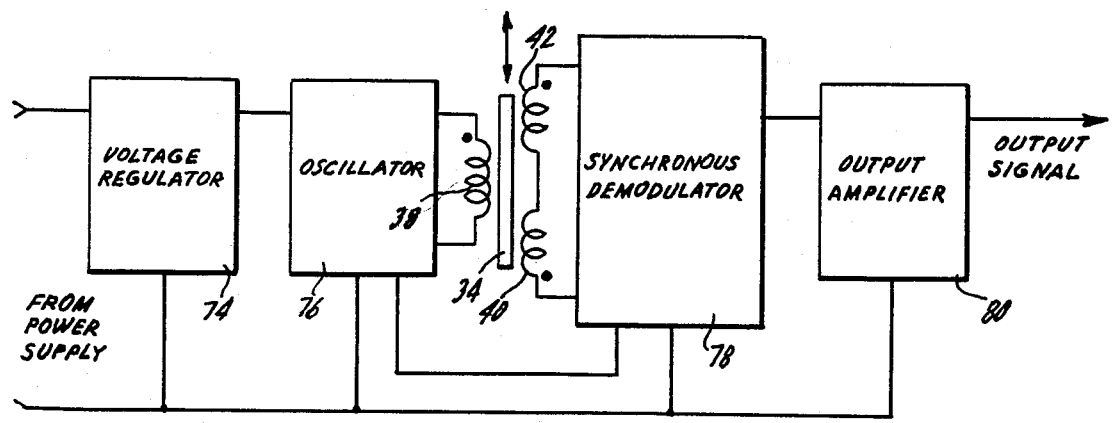

PRESSURE TRANSDUCER

The invention relates to pressure transducer and more particularly to a linear variable differential transformer pressure transducer which provides an accurate static pressure measurement in the presence of vibration.

Linear variable differential transformer (LVDT) pressure transducers are well known and popular for making fluid pressure measurements. Typically, these transducers require an elastically deformable sensing element, such as a Bourdon tube, that responds to omnidirectional fluid pressure. The displacement or deformation of the Bourdon tube due to applied pressure is measured by a linear variable differential transformer. The transformer is made up of primary and secondary coils, which surround a core. One end of the core is secured to the sensing element and as the sensing element deforms in response to the applied pressure the core is displaced linearly with respect to the coils. A voltage is then generated across the secondary coils of the transformer. This voltage is proportional to the applied pressure and may be converted into a pressure measurement by a standard readout device.

The natural frequency of a Bourdon tube, the pressure sensing element used in many LVDT pressure transducers, varies across the tubes operating pressure range, but is usually relatively low. As such, LVDT pressure transducers utilizing Bourdon tubes are desirable for low frequency industrial measurements. However, when these LVDT pressure transducers are subjected to vibration, destructive harmonic resonances are often created in the Bourdon tube. These harmonic resonances result in inaccurate fluid pressure measurements and cause damage to the mechanical parts of the transducer, decreasing its useful life.

Attempts have been made to correct these problems. U.S. Pat. No. 1,565,447 issued to O.W. Heise and U.S. Pat. No. 3,915,008 issued to Silverman et al show the use of a dashpot in connection with a pressure transducer for damping vibrations in the moving parts of the transducer. Both of these patents show mechanical pressure transducers in which the deflection of the Bourdon tube is translated directly to a mechanical indicator. These patents do not show the use of a linear variable differential transformer for translating the deflections of the Bourdon tube into an indication of the pressure of the fluid being measured.

It is therefore an object of the invention to provide an LVDT pressure transducer which provides an accurate static pressure measurement in the presence of vibration.

Another object of the invention is to provide a LVDT pressure transducer which surpresses destructive harmonic resonances created in the pressure sensing element.

Still another object of the invention is to provide a LVDT pressure transducer which is simple in construction and economical to manufacture. pressure transducer in which a dashpot serves to suppress destructive harmonic resonances of the pressure sensing element and as a bobbin for the coils of a differential transformer.

A still further object of the invention is to provide an LVDT pressure transducer which prevents inaccurate fluid measurements resulting from harmonic resonances in the pressure sensing element.

An additional object of the invention is to provide an LVDT pressure transducer which prevents damage to the mechanical parts of the transducer caused by harmonic resonances in the pressure sensing element.

In accordance with the invention an LVDT pressure transducer includes a dashpot adapted to support the coils of a differential transformer, the core of which is disposed within the dashpot and connected to one end of a Bourdon tube. In response to variations in the pressure of a fluid the Bourdon tube is deformed thereby displacing the core within the dashpot. Displacement of the core causes the generation of an electrical signal on the coils which affords an indication of the pressure of the fluid. A damping fluid is contained within the dashpot and surrounds the core, which enters the dashpot through an opening in a flexible boot covering the open end of the dashpot. The pressure transducer serves to suppress destructive harmonic resonances of the Bourdon tube by imparting a variable restraining force on the movement of the core. The pressure transducer exerts minimal restraining force to the low frequency movements of the core caused by normal fluctuations in the fluid pressure, but exerts a high restraining force against sudden pressure transients or vibration near the pressure sensing element's resonant frequency. In the accompanying drawings to which reference is made in the instant specification and in which like reference characters are used to denote like parts in the various views:

FIG. 1 is a side elevation of the pressure transducer with parts broken away;

FIG. 2 is a sectional front elevation of the pressure transducer taken along the lines 2—2 of FIG. 1; and FIG. 3 is a schematic diagram of the electronic circuitry associated with the pressure transducer.

Referring now to FIGS. 1 and 2, the pressure transducer 10 includes a generally circular base 12 which supports a block 14 having a nozzle 16. Nozzle 16 is formed with threads 18 for receiving the end of a pressure line, not shown, through which fluid under pressure is supplied to the transducer 10. Block 14 is formed with a conduit 20 which connects nozzle 16 to an oval-shaped opening 22 formed in the base of a slot 24. Slot 24 is adapted to receive one end of a Bourdon C-tube 26, such that the opening of the tube 26 communicates with a conduit 20 through opening 22. The tube is soldered into place to provide a good seal and prevent fluid leakage. The Bourdon tube 26 extends along the base 12 with its opposite end soldered to a cap 28 formed with a tab 30. Tab 30 is soldered to a nonmagnetic crank 32 to which the core 34 of a linear variable differential transformer is secured.

Core 34 is disposed within a dashpot 36 which lies adjacent to block 14. Dashpot 36 also serves as a bobbin for the primary or input coil 38 and the secondary or output coils 40 and 42 forming the linear variable differential transformer. Dashpot 36 is filled with a viscous silicon damping fluid 44 which serves to suppress the destructive harmonic resonances of the Bourdon tube created by vibration.

A flexible boot 46 formed from any flexible temperature stable material is formed with a lip 48 extending along its circumference and a sleeve 50 terminating in an opening 52 in the approximate center of the boot. Lip 48 is received in a conformingly shaped slot 54 formed along the top of the dashpot 36, thereby securing the boot 46 to the dashpot. Sleeve 50 surrounds the crank 32 which extends into the dashpot 36 through opening 52. Boot 46 serves to retain the damping fluid 44 within the dashpot 36 while imparting only a minimal restraining force on the crank 32 and Bourdon tube 26. Boot 46 also serves as a damper to suppress the destructive harmonic resonances of the Bourdon tube.

While I have described a pressure transducer 10 employing a Bourdon C-tube 26, a helical Bourdon tube or a diaphragm could also be used.

Block 14 receives screws 58 used to secure a disc-shaped platform 60 to the block 14. Platform 60 holds the electronic circuitry making up the linear variable differential transformer. In addition, platform 60 supports dashpot 36 adjacent to block 14 in studs 62. Electrical connections are made to the platform 60 through a grommet 64 disposed within opening 66 of a bell-shaped cover 68. Cover 68 is formed with a lip 70 along its periphery which is received in a socket 72 formed along the circumference of the base 12.

Referring now to FIG. 3, the electronic circuitry associated with the pressure transducer 10 includes a voltage regulator 74 which provides output to an oscillator 76 which in turn places a substantially constant A.C. voltage on the primary winding 38. The secondary windings 40 and 42 are connected in opposition to each other across a synchronous demodulator 78. The output of the synchronous demodulator is amplified by an output amplifier 80 which provides the final output signal. This final output signal may then be supplied to a standard readout device, not shown. As the transformer core 34 is displaced in one direction or the other, a voltage is developed across the secondary coils 40 and 42. This voltage will be proportional to the applied voltage and the amount of core displacement from its normal position, which in turn is proportional to the fluid pressure being measured.

During operation of the pressure transducer 10, fluid enters the Bourdon tube 26 through nozzle 16. As the Bourdon tube 26 is pressurized, its radius of curvature decreases or increases and the end of the tube 26 soldered to the cap 28 moves either downwardly or upwardly, pulling the core 34 accordingly. The displacement of the core 34 causes the development of a proportional voltage across the secondary coils 40 and 42 which is amplified by amplifier 80 to provide the final output signal. This final output signal may then be supplied to a standard readout device, which provides a fluid pressure measurement. Destructive harmonic resonances created in the Bourdon tube 26 as a result of vibration are suppressed by the damping fluid 44 contained within the dashpot 36, which is retained within the dashpot by the flexible boot 46. The pressure transducer 10 exerts minimal restraining force to the low frequency movements of the core caused by normal fluctuations in the fluid pressure, but exerts a high restraining force against sudden pressure transients or vibration near the pressure sensing element's resonant frequency. As a result accurate pressure measurements are provided and damage to the mechanical parts of the transducer is prevented.

As will be readily apparent to those skilled in the art, the invention may be used in other specific forms or for other purposes without departing from its spirit or central characteristics. The present embodiment is therefore to be considered as illustrative and not restrictive, the scope of the invention being indicated by the claims rather than by the foregoing description, and all embodiments which come within the range of equivalence of the claims are intended to be embraced.

I claim:

1. Apparatus for measuring the pressure of a fluid including in combination a dashpot, a core disposed within said dashpot, means responsive to variations in pressure for displacing said core within said dashpot, means located on said dashpot responsive to movement of said core within said dashpot for providing an indication of the pressure of said fluid, and damping fluid contained within said dashpot for suppressing the harmonic resonances of said pressure responsive means.

2. Apparatus for measuring the pressure of a fluid including in combination a dashpot, a core disposed within said dashpot, coil means supported on said dashpot pot, means responsive to variations in pressure for displacing said core within said dashpot, means including said coil means responsive to movement of said core within said dashpot for providing an indication of the pressure of the fluid, and damping fluid contained within said dashpot for suppressing the harmonic resonances of said pressure responsive means.

3. Apparatus as in claim 2 in which said means responsive to variations in the pressure of said fluid comprises a Bourdon tube.

4. Apparatus for measuring the pressure of a fluid including in combination a dashpot having an open end, a core disposed within said dashpot, a plurality of coils supported on said dashpot, means responsive to variations in pressure of said fluid for displacing said core within said dashpot, means including said coils responsive to movement of said core for providing an indication of the pressure of said fluid, a damping fluid contained within said dashpot and surrounding said core to suppress harmonic resonances of said means responsive to variations in pressure.

5. Apparatus as in claim 4 in which said means responsive to variations in the pressure of said fluid comprises a Bourdon tube.

6. Apparatus as in claim 5 which further comprises means covering the open end of said bobbin to prevent leakage of said damping fluid while permitting displacement of said core within said dashpot.

7. Apparatus as in claim 6 in which said means covering the open end of said bobbin comprises a flexible boot having an opening through which said core passes and a lip received along the edge of the open end of said dashpot, said boot suppressing harmonic resonances of said Bourdon tube.

8. Apparatus as in claim 4 in which said plurality of coils comprise a first coil adapted to receive a constant electrical signal and a pair of secondary coils on which an electrical signal is developed in response to movement of the core within the bobbin.

* * * * *